United States Patent
Kirk et al.

(10) Patent No.: US 9,758,255 B1
(45) Date of Patent: Sep. 12, 2017

(54) METHODS AND SYSTEMS FOR CONTROLLING FLAMMABILITY RISK IN AIRCRAFT FUEL TANKS

(71) Applicant: Quiet Wing Aerospace LLC, Redmond, WA (US)

(72) Inventors: Philip Kirk, Encinitas, CA (US); Om Prakash, Everett, WA (US); Peter Swift, Woodinville, WA (US)

(73) Assignee: KPS, LLC, Woodinville, WA (US)

( * ) Notice: Subject to any disclaimer, the term of this patent is extended or adjusted under 35 U.S.C. 154(b) by 0 days.

(21) Appl. No.: 14/838,350

(22) Filed: Aug. 27, 2015

Related U.S. Application Data

(63) Continuation-in-part of application No. 13/925,720, filed on Jun. 24, 2013, now abandoned.

(60) Provisional application No. 61/663,337, filed on Jun. 22, 2012.

(51) Int. Cl.
| | |
|---|---|
| *B64D 45/00* | (2006.01) |
| *B64D 37/32* | (2006.01) |
| *B64D 37/34* | (2006.01) |
| *B64D 13/08* | (2006.01) |

(52) U.S. Cl.
CPC .............. *B64D 37/32* (2013.01); *B64D 13/08* (2013.01); *B64D 37/34* (2013.01)

(58) Field of Classification Search
CPC ........... A62C 3/08; B64B 25/00; B64B 37/32; B64B 37/34; B64B 2013/0659
See application file for complete search history.

(56) References Cited

U.S. PATENT DOCUMENTS

| | | | | |
|---|---|---|---|---|
| 3,199,812 | A * | 8/1965 | Spoecker ............... | B64D 37/32 244/135 R |
| 4,378,920 | A * | 4/1983 | Runnels ................ | B64D 37/32 137/209 |
| 7,007,893 | B2 * | 3/2006 | Loss ..................... | B64D 37/32 244/129.2 |
| 7,509,968 | B2 * | 3/2009 | Surawski ............... | B64D 37/32 137/2 |
| 8,602,362 | B2 * | 12/2013 | Buchwald ............. | B64D 37/24 220/88.3 |
| 8,757,550 | B2 * | 6/2014 | Wilde .................... | B64D 37/04 244/135 R |
| 2010/0096118 | A1 * | 4/2010 | Scherer ................ | B64D 13/00 165/253 |
| 2011/0300786 | A1 * | 12/2011 | Kastell .................. | B64D 13/08 454/76 |
| 2012/0096879 | A1 * | 4/2012 | Lam ..................... | B64D 37/32 62/93 |

* cited by examiner

*Primary Examiner* — Philip J Bonzell
(74) *Attorney, Agent, or Firm* — DWC Law Firm, P.S.; David Chen

(57) ABSTRACT

Commercial aircraft fuel tanks, such as the center wing tank or body tanks, can be subject to explosion hazard due to heat balance around the tanks. Various embodiments of the present disclosure reduce the flammability exposure of the fuel tank by drawing cold air from a cold air unit of the aircraft and passing the air to a space proximate the fuel tank, without disrupting the cold air system in flight performance.

8 Claims, 8 Drawing Sheets

METHODS AND SYSTEMS FOR CONTROLLING FLAMMABILITY RISK IN AIRCRAFT FUEL TANKS

CROSS REFERENCE TO RELATED APPLICATION(S)

This application is a continuation-in-part of U.S. patent application Ser. No. 13/925,720, filed Jun. 24, 2013, which claims the benefit of U.S. provisional patent application Ser. No. 61/663,337, filed Jun. 22, 2012, both of which are incorporated herein by reference their entireties.

BACKGROUND

1. Technical Field

The present disclosure relates to commercial aircraft fuel tanks, and more particularly, to controlling fuel tank conditions to lower ignition risks.

2. Related Art

Commercial aircraft fuel tanks are sources of flammability risk. Some commercial aircraft have three main fuel tanks, a wing tank in each wing, plus a center tank, or center fuel tank, between the two wings (often considered part of the wing structure, but physically separated from the outer wing tanks). The wing tanks are exposed to cold outside air when the aircraft climbs to altitude. This cools the fuel in the wing tanks to well below the lower flammability limit ("LFL") for the fuel. Thus, it is usually thought that only the time spent on the ground and during initial climb out contributes to the cumulative amount of flammability exposure in the wing tanks. The wing tanks therefore typically meet the total exposure limit of 3%, (or other applicable limits established by the relevant regulations) and this has long been accepted by the FAA. The center tank, by contrast, is embedded in the fuselage, often within, or proximate, the environmental control system ("ECS") bay, so it is not exposed to the cold outside air as much as the wing tanks. Underneath, or proximate, the center tank are typically located air-conditioning packs (A/C packs) that can emit high amounts of heat. This can or could cause the center tank to operate well above LFL for the fuel in the center tank for most of a flight.

Current methods employed by industry to control this flammability risk commonly involve the installation of nitrogen generation equipment that is routed to the fuel tanks, displacing the fuel vapors, and rendering the tanks inert. This method is very costly both for installation of the equipment, and also costly to maintain. They involve many system components, including pre-filters, pressure and temperature regulators, membranes filters, check valves and control circuits and indicators.

In the near term, it is estimated that at least 7,000 of the commercial aircraft operating in the US and Europe will be required to meet new flammability standards imposed by the FAA. These aircraft will all be required to be fitted with equipment that will reduce the flammability exposure to the levels stipulated by the FAA.

BRIEF DESCRIPTION OF DRAWINGS

FIG. 7 is a simplified perspective drawing showing a cold air bleed configuration for the ECS bay for use with some embodiments of the present disclosure, such as the embodiment shown in FIG. 6a.

FIG. 8 is a graph depicting measured in-flight temperature in relation to a center tank fuel tank for an aircraft, and also depicting a theoretical temperature variation of the center tank when the ECS bay is cooled on the ground only using a process of the present disclosure such as that shown and described in relation to FIG. 6a.

DETAILED DESCRIPTION

Figure 1A:
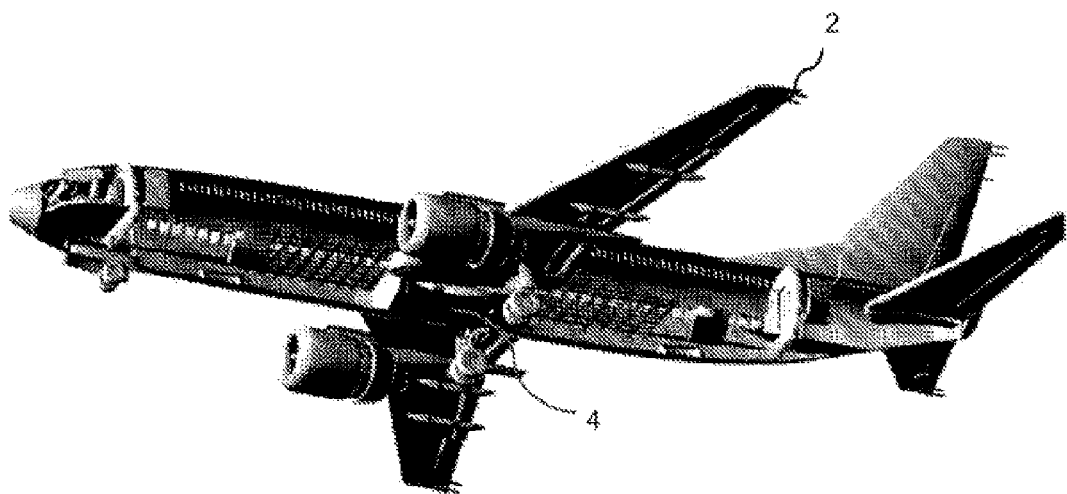
FIG. 1a shows a simplified illustration of a prior art aircraft having a center wing fuel tank.

In the following description, certain specific details are set forth in order to provide a thorough understanding of various embodiments of the present disclosure. However, upon reviewing this disclosure one skilled in the art will understand that the disclosure may be practiced without many of these details. In other instances, well-known structures and methods associated with aircraft fuel systems and related operations have not been described in detail to avoid unnecessarily obscuring the descriptions of the embodiments of the disclosure.

In the present description, the terms "a" and "an" as used herein refer to "one or more" of the enumerated components. The use of the alternative (e.g., "or") should be understood to mean either one, both, or any combination thereof of the alternatives. As used herein, the terms "include" and "comprise" are used synonymously, and these terms and variants thereof are intended to be construed as non-limiting. The term "cold air unit," as used herein can describe an A/C unit or other refrigeration or cooling unit.

The present disclosure is described in the context of aircraft fuel tanks. However, as will be appreciated by those skilled in the art after reviewing this disclosure, various embodiments may have application in other fuel systems. Also, the present disclose is described in the context of application to particular aircraft, such as, for example, the Boeing™ 737™, and its center wing fuel tank. However, as will be appreciated by those skilled in the art after reviewing this disclosure, various locations and structures of the fuel tanks (e.g., body tanks, wing tanks, etc.) and surrounding systems, and various aircraft models or types (e.g., Boeing 757, 767, 777, and all AIRBUS™ aircraft), are contemplated herein, and are not outside of the scope of the applicability of the present disclosure and/or various equivalent modifications which could be made within the spirit and scope of this disclosure to accommodate those other fuel tank configurations. For example, although various examples of the temperature and pressure regulation described herein are described with respect to a center wing tank located proximate an ECS heat emitting bay, there are aircraft that do not have the ECS bay located under the center wing tank, but are still at risk due to, for example, being adjacent to heated cabin and cargo bay without adequate cooling. Also, aircraft with auxiliary fuel tanks mounted inside the cargo bays, such as, for example, third party systems installed after the aircraft have been delivered, are also sometimes at risk. As will be appreciated by those skilled in the art after reviewing this disclosure, the systems and methods disclosed herein also can be applied to various such fuel tanks to lower or control flammability risks.

As will be appreciated by those skilled in the art, the flammability exposure of aircraft fuel tanks is dependent on several factors including:

1. The presence of hydrocarbons in the vapors inside the fuel tanks.
2. The temperature of the vapors.
3. The pressure of the vapors.
4. The time during the flight that the combination of the above three conditions are such that the vapors fall within a flammability envelope within which a vapor will ignite, if exposed to an energy source.

FAA regulations govern required cumulative flammability exposure limits for fleet of aircraft being operated. The limits can be, for example, 3% or 7%, or other applicable limits established by the relevant FAA regulations, according to the particular operator and the aircraft that constitute the fleet, and according to particular flight segments under particular conditions.

Figure 1B:
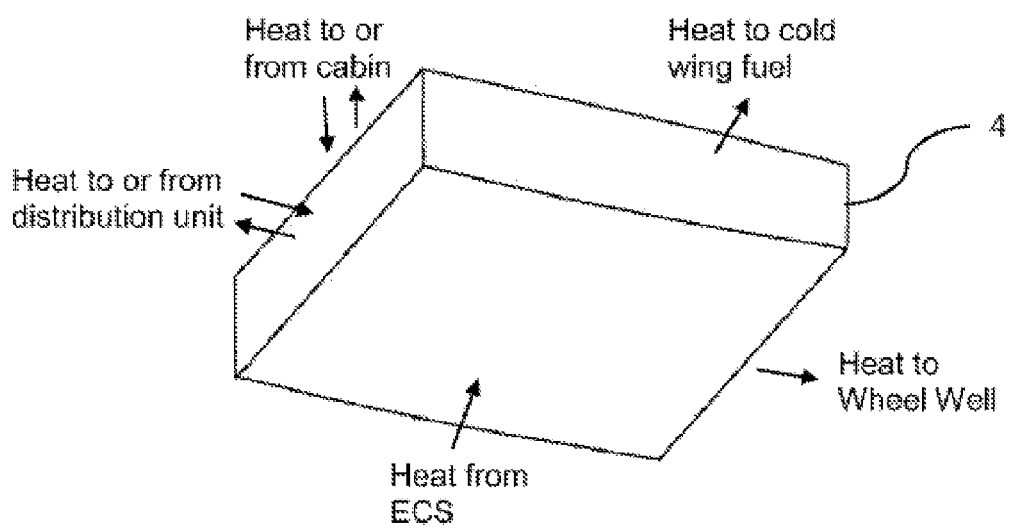
FIG. 1b shows a simplified illustration of a prior art center wing fuel tank, for the aircraft of FIG. 1, and further showing various heat exchanging sources with the center wing fuel tank and their approximate orientation with respect to the center wing fuel tank.

Referring to FIGS. 1 & 1b, many aircraft 2, such as, for example, the Boeing 737, include a center wing fuel tank 4 (or "center wing tank"). The center wing tank 4 has heat input from various operating units, as shown in FIG. 1b, such as, for example, the A/C distribution unit and the environmental control system (ECS). Overall, this can/could cause the center tank to operate well above LFL for the fuel in the center tank for most of a flight.

Figure 2:
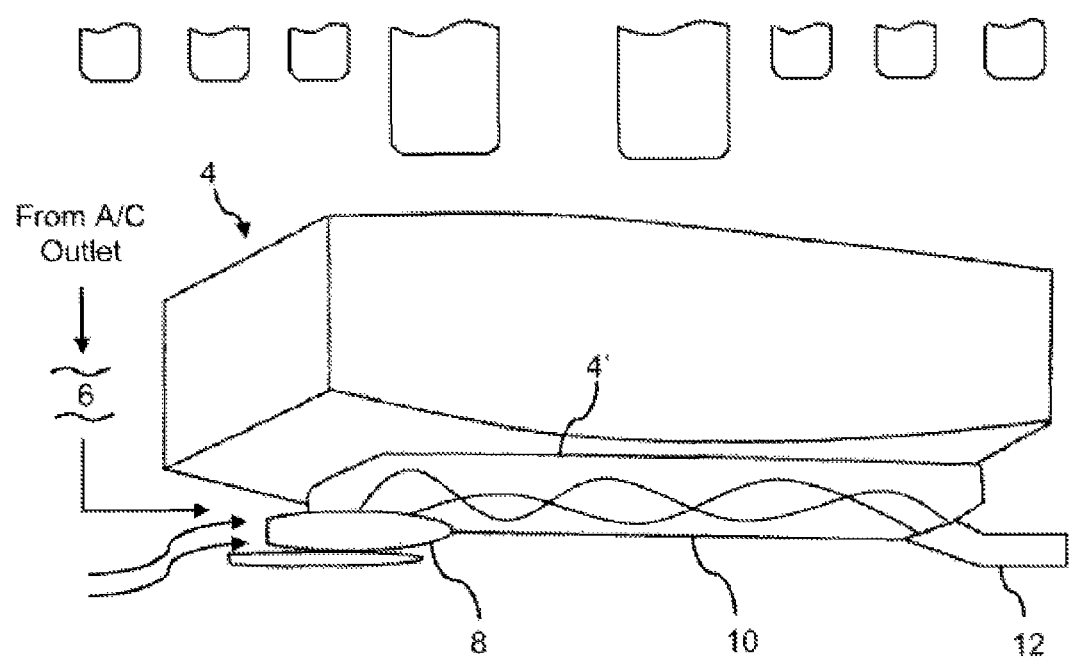
FIG. 2 is a simplified side elevation cutaway view showing an embodiment of a center wing fuel tank and ECS bay of the present disclosure.

Referring to FIG. 2, in some embodiments of the present disclosure, an A/C bleed line 6 is connected to cold air from an air conditioning ("A/C") outlet. Note that the A/C bleed line 6 is illustrated in FIG. 2 as outside the environmental control system ("ECS") bay 10, but in various embodiments, the bleed can be taken from inside the ECS bay 10. In particular, in some embodiments, the A/C bleed line can direct cold outlet A/C air (or air from the cold air unit), into the ECS bay 10 or to other locations proximate the center wing tank, such as around an outside wall thereof, to help prevent the ECS bay and tank from overheating while the aircraft 2 is on the ground. This can, in turn, prevent the center wing tank 4 from heating up while the aircraft is on the ground.

During flight, the A/C bleed line 6 can be shut off. Also, cold outside air can be entrained into the ECS bay 10 (or A/C compartment) through an NACA scoop 8, or other intake structure, as shown in FIG. 2. As will be appreciated by those skilled in the art after reviewing this disclosure, the NACA scoop (or "NACA duct") is a common form of low-drag air inlet design. Like the A/C bleed line 6 air, the entrained cold outside air can also be directed to various locations proximate the center fuel tank in some embodiments.

Air from the A/C bleed line 6 and air entrained from the outside air intake structure 8, can be vented through an outline vent 12 after circulation. In some embodiments, A/C bleed line 6 shut-off valve is automatically opened to the ECS bay 10 through an onboard control system, when the aircraft 2 is operational on the ground, and is automatically shut-off when the aircraft 2 is in flight, and air can be inducted through the NACA scoop.

Figure 3:
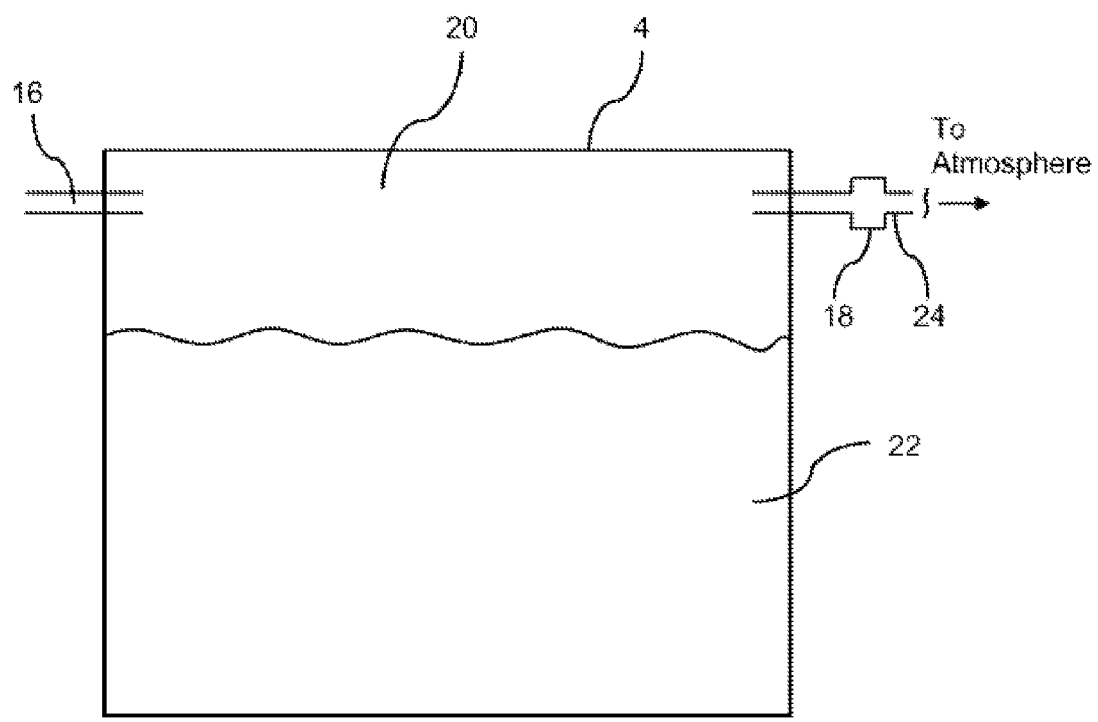
FIG. 3 is a simplified side elevation view of an embodiment of a center wing fuel tank and associated ventilation system of the present disclosure.
Figure 4:
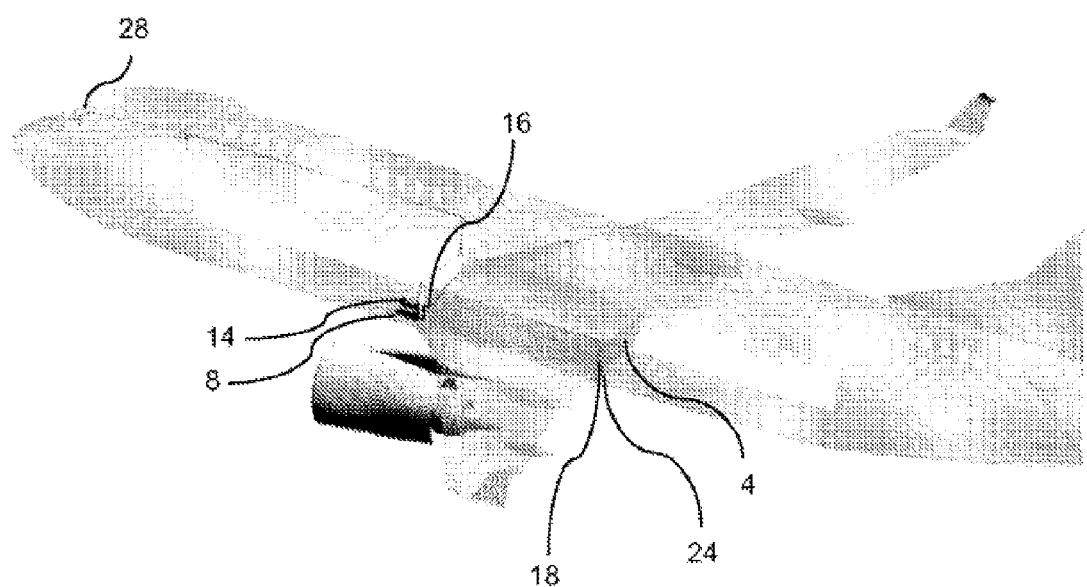
FIG. 4 is a simplified diagram of an aircraft employing an embodiment of the ventilation system of the present disclosure.

Referring to FIGS. 3 & 4, in some embodiments of the present disclosure, the inducted air, inducted from the outside air through the intake structure 8 (e.g., the NACA scoop) located in the fuselage skin of the aircraft 2, can be routed via an inlet duct 16 to be discharged into one or more fuel tanks through, such as the center wing tank 4, of the aircraft 2. In some embodiments, the inducted outside air can be routed through a refrigeration or cooling unit 14, before being discharged into the fuel tanks. As will be appreciated by those skilled in the art after reviewing this disclosure, the refrigeration unit 14 (or cold air unit) can include a compressor, condenser, and associated electrical wiring (not illustrated) and can be separately provided from otherwise existing cold air units on the aircraft 2, or can utilize otherwise existing cold air units in some embodiments.

Referring to FIG. 3, flow of air through the center wing tank 4 (or other fuel tanks) can be regulated by a pressure release valve 18 that can control back-pressure in the tank, and can vent the air to an outlet line 24, or outlet duct, that leads back out to the surrounding atmosphere through the fuselage skin. Thus, the fuel tank 4 vapors can be cooled by very cold outside air that presents low load on the refrigeration unit because the air is already cold from the outside air during flight. The refrigeration unit 14 can help ensure that the temperature of the air is at, or below, a pre-selected value. The refrigerated air can be pressurized to between 1 psi and 4 psi, which may be impacted by the setting/selection of the pressure release valve 18, so that hydrocarbon vapors from the liquid fuel are purged from the tanks, reducing the hydrocarbon content and pressure is controlled directly or indirectly in the fuel tank.

The result of any one or a combination of the effects from the implementations above can be to bring the fuel tank vapors into an inert regime where they will not explode.

Figure 5:
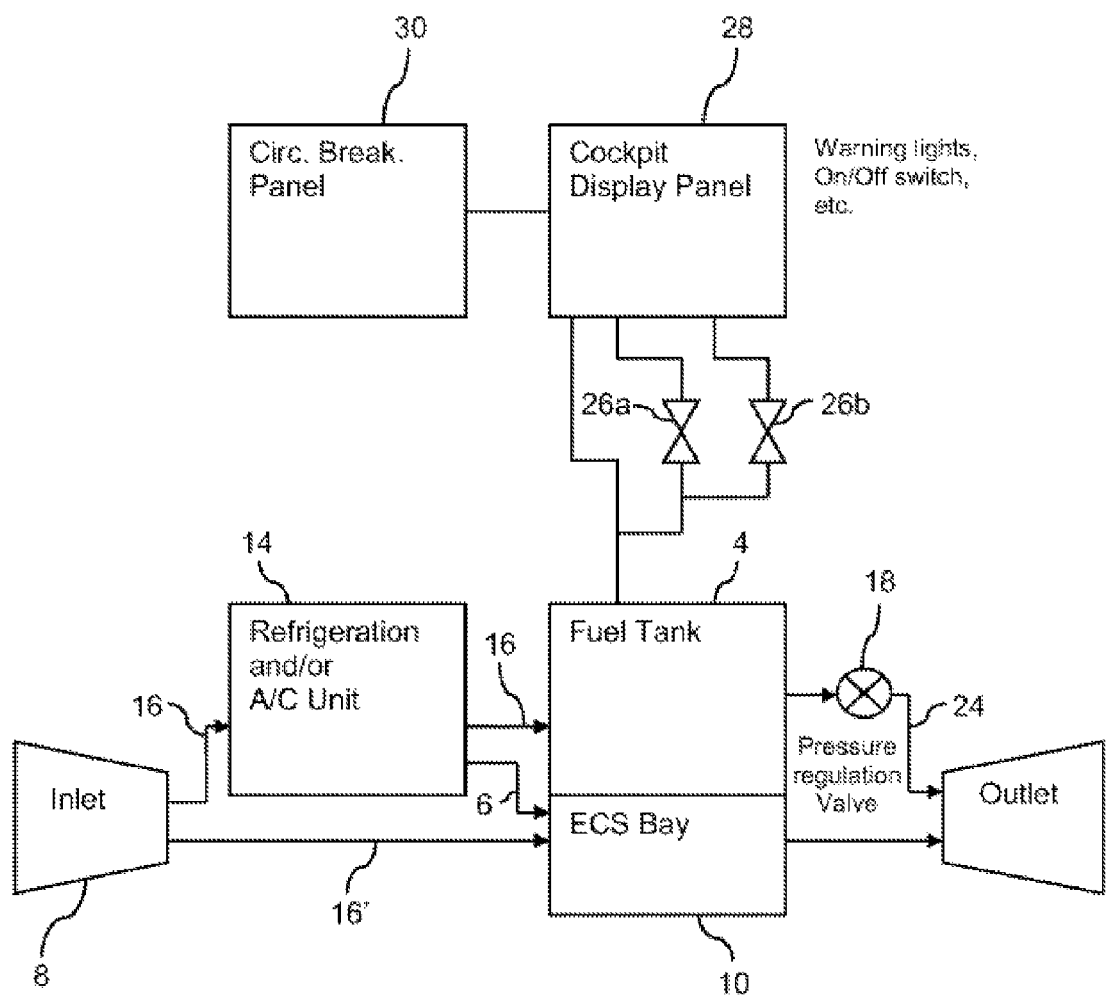
FIG. 5 is a simplified diagram showing system components for an embodiment of the fuel tank system of the present disclosure.

Referring to FIG. 5, in some embodiments, pressure and temperature sensors 26a, 26b, are connected to locations inside the fuel tank (e.g., center wing tank 4, or other fuel tanks) to monitor conditions. Also, output from the sensors can be sent to a display unit 28 in the cockpit of the aircraft 2. The display unit 28 in the cockpit can include warning lights to indicate when the pressure/temperature cross preset values. The pre-set values can be selected based on, or as a function of, for example, known thresholds of flammability for the fuel in question. As will be appreciated by those skilled in the after reviewing this disclosure, the pre-set values can also take into account, multiple factors that provide input for calculating flammability limits, predictive trending of such calculations, etc.

In some embodiments, the refrigeration unit 14 can be automated to cool the incoming air only when it exceeds a specified temperature, and provides pressure to the fuel tanks. The pressure relief valve 18 can regulate the fuel tank pressure to a prescribed value, and allows the hydrocarbon rich vapor to be purged from the tanks.

The air scoop inlet 8 by itself provides cold, hydrocarbon free air to ventilate the fuel tanks and reduce the flammability exposure while the aircraft 2 is flying at altitude. In some embodiments, the refrigeration unit 14, or A/C bleed line, can also be operated to provide cold fuel free air to the tanks when the aircraft 2 is stationary or at low altitude and speed. The pressure relief valve 18 can cause the air tank pressure to be increased, while protecting the tank from over pressurization.

The amount of air inlet running through the inlet air conduits to ECS compartment, and/or fuel tanks, the amount of refrigeration, the choice of the pressure relief valve on the fuel tank, can all have a direct bearing on the flammability exposure value, as will be appreciated by those skilled in the art after reviewing this disclosure.

In some embodiments of the present disclosure, the cold outside air that is routed into the ECS bay 10 (or A/C compartment), as discussed above and illustrated in FIG. 2, may be used simultaneously with the inducted air that is discharged into the center wing tank (or other fuel tanks), as illustrated in FIGS. 3 & 4. For example, the air routed into the ECS bay 10, and air discharged into the center wing tank, may share a common intake structure and be split thereafter, or may have separate intake structures on the fuselage skin. Also, in some embodiments, like the air discharged into the center wing tank, the air inducted from outside and routed to the ECS bay may also be cooled in the refrigeration unit 14 before being sent to the ECS bay. In other embodiments, no cooling air is directed into the fuel tanks, and sufficient cooling is provided by cooling the ECS bay or other locations proximate the fuel tanks. Also, in some embodiments, only the A/C bleed line air used in the manners described above is cooled by onboard refrigeration or other cooling system, while, cold outside air directed to the ECS bay or other locations around the fuel tank(s) are not cooled through onboard refrigeration or cooling. That is, in some embodiments, no direct discharge or cold air into the fuel tanks is required, and also, no additional cooling of outside cold air is required to maintain acceptable flammability control. As will be appreciated by those skilled in the art after reviewing disclosure, various combinations of the temperature or pressure methods and systems described above can be employed depending on demand required to maintain acceptable LFL compliance.

Referring to FIG. 2, in some embodiments, insulation 4' can be provided around the ECS bay/ducts 10 to further keep the center wing tank 4 cool. Also, any of the intake air lines from outside air inducted for use in the ECS bay or fuel tanks, can also be insulated.

As previously referenced above, in some embodiments, implementing only one of the cooling effects from the implementations described above, can be sufficient with respect to controlling flammability risks. For example, ECS bay temperatures can reach about 200 Deg F during taxi, so the ECS system generates enormous amounts of heat that in turn heats the center wing tank. However, once the aircraft is airborne, the cold ambient air can have an overall sufficient cooling effect on the center tank (as demonstrated through simulations referenced below) when combined with temperature control of the ECS bay on the ground. That is, if the ECS bay temperature is controlled within certain conditions while on the ground, flammability requirements could be met without any further modification. For example, in the embodiment shown in FIG. 6a, the only cooling for the center tank 4 is provided by cold air bleed from the ECS cold air unit 14 to the ECS bay 10, and a valve 6' is provided for shut-off, which can be controlled as part of a valve system to automatically open the cold air bleed 6 when the aircraft is taxiing, or operational on the ground, and automatically shut it off when the aircraft is airborne, or shortly thereafter. In such embodiments, the cold air bleed from the refrigeration or A/C unit is provided to the ECS bay only while the aircraft is operational on the ground.

In some embodiments, this cold air bleed 6 with shut off valve 6' (e.g. FIG. 6a) is implemented as a modification to existing aircraft, by tying, or otherwise connecting, the cold air bleed 6 into a pre-existing cold air outlet line running from the refrigeration or A/C unit, and also installing the shut-off valve 6', which prevents cold air bleed from being taken from the pre-existing cold air outlet line when it is shut. In particular, the automated shut-off valve 6' can be provided so as not to affect the in-flight performance of the A/C system, because it is shut when the aircraft in is flight. In such embodiments, no air enters the fuel tanks, so no modifications are required to pre-existing fuel tanks, etc., and no outside air is needed for routing into the ECS bay either, and instead, only A/C bleed air is routed through the ECS bay and under the center wing tank, during operation on the ground, and then vented (e.g., out through the wheel well).

Figure 6A:
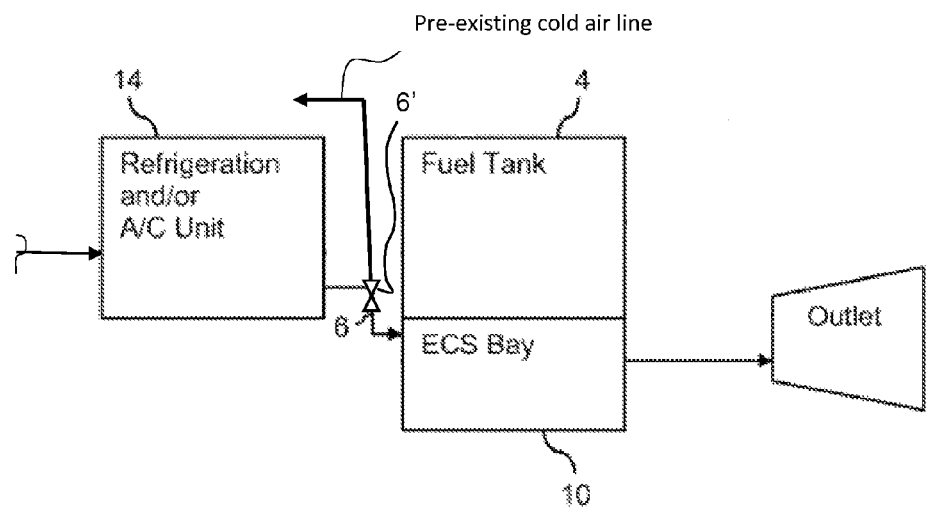
FIG. 6a is a simplified process diagram showing an alternative embodiment of the fuel tank system of the present disclosure, wherein a cold air bleed line for the ECS bay is provided as a system modification tied into a pre-existing cold air outline line. It is noted that although this simplified diagram shows the tie-in point outside the ESC bay, the tie-in point can also be within the ESC bay, such as, for example, as shown in FIG. 7.
Figure 6B:
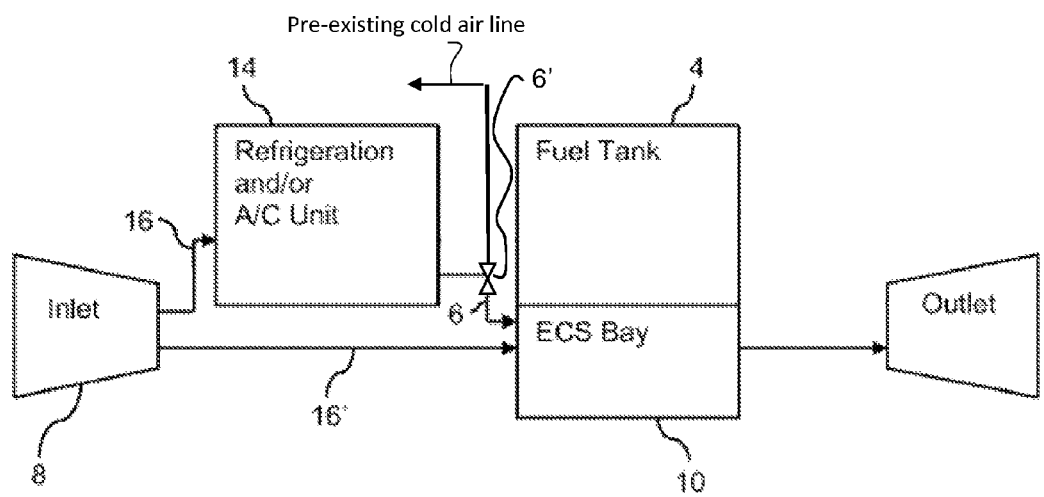
FIG. 6b is a simplified process diagram showing another alternative embodiment of the fuel tank system of the present disclosure.

In other embodiments, such as shown in FIG. 6b, outside air can also be drawn through the ECS bay when the aircraft is in flight, as described above, but without providing any venting into the fuel tank 4.

FIGS. 6a and 6b do not illustrate the monitoring elements shown in FIG. 5, such as, for example, without limitation, the pressure and temperature sensors 26a, 26b, and display unit 28 in the cockpit of the aircraft 2; however, as will be appreciated by those skilled in the art upon review of this disclosure, any one or more of those monitoring elements can be combined with the embodiments shown in FIG. 6a and/or FIG. 6b in the spirit of the present disclosure.

Figure 7:
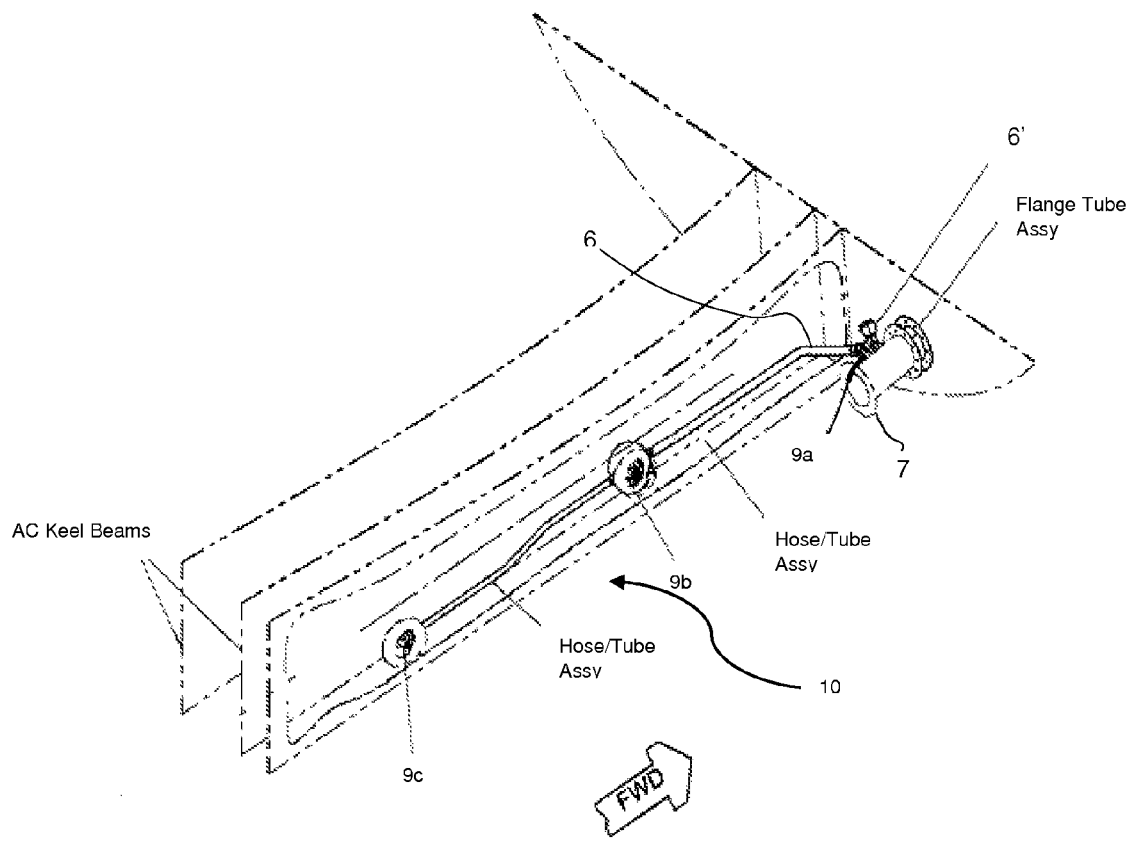

Referring to FIG. 7, in some embodiments, when an aircraft is modified to provide cold air bleed from an existing cold air outline line 7 of the refrigeration/A/C unit (ECS cold air) to the ECS bay, such as discussed above in reference to FIG. 6a, the cold air bleed line 6 can be can be tied into the existing cold air outlet line 7, with valve 6' (e.g., a solenoid valve) being disposed in the bleed line for use in automatically controlling the valve 6' to open when the aircraft is operational on the ground, and to shut when the aircraft is in flight. The valve 6' can be disposed proximate the connection of the bleed line 6 with the existing cold air line 7. Also, the bleed line can be in fluid communication with multiple discharged points, such as shown in FIG. 7. For example, a first discharge point could be located at a first tee fitting 9a proximate the existing line 7. That is, as will be appreciated by those skilled in the art after reviewing this disclosure, an upstream leg of the first tee fitting 9a can communicate cold air to a discharge leg of the first tee fitting 9a, with the discharge leg leading to an opening into the ECS bay. Also, a downstream leg of the first tee fitting 9a, can communicate cold air downstream of that leg to downstream tubing or hose of the bleed line 6, which runs to a different location in the ECS bay 10. The controlled valve 6' can be disposed upstream of the upstream leg of the first tee fitting 9a, near the existing cold air line 7. Downstream of the first tee fitting 9a, the bleed line 6 can carry cold bleed air to a second tee fitting 9b. Like the first tee fitting 9a, the second tee fitting 9b can also have an upstream leg, which can communicate cold air to a discharge leg of the second tee fitting 9b, and to a downstream leg of the second tee fitting 9b. Like the discharge leg of the first tee fitting, the discharge leg if the second tee fitting 9b can lead to an opening in the ECS bay, but the opening can be set apart from the discharge leg of the first tee fitting 9a, to help disperse the cold air in the ECS bay. Finally, the downstream leg of the second tee fitting 9b can be connected to a further downstream tube or hose of the bleed line 6, which carries cold air to another downstream opening, which can be, for example, an open end of an elbow fitting 9c. In such embodiment, there are three discharge openings for cold air from the A/C unit, into the ECS bay, each discharge opening being spaced apart to help distribute air in the ECS bay. In other embodiments, more than three opening can be provided, or less than three discharge openings can be provided. Although the various structural configurations for cooling described above have been described in the context of modifications made to existing aircraft, they can also be provided as part of original aircraft equipment, as will be appreciated by those skilled in the art after reviewing this disclosure.

In other embodiments, the valve 6' is controlled to automatically open when the aircraft is operational on the ground, but to shut once the airspeed and/or altitude of the aircraft is at a pre-determined value (which can result in, for example, the valve being open when the aircraft is operational on the ground, and for a short duration after the aircraft has begun flight, before it shuts). In other embodiments, the valve can be controlled to open and/or shut depending on monitored conditions of the fuel tank 4, such as, for example, based on the sensors as described above, wherein when pre-determined threshold values (which impact flammability risks) are exceeded, the valve is automatically opened even if the aircraft is in flight.

Figure 8:
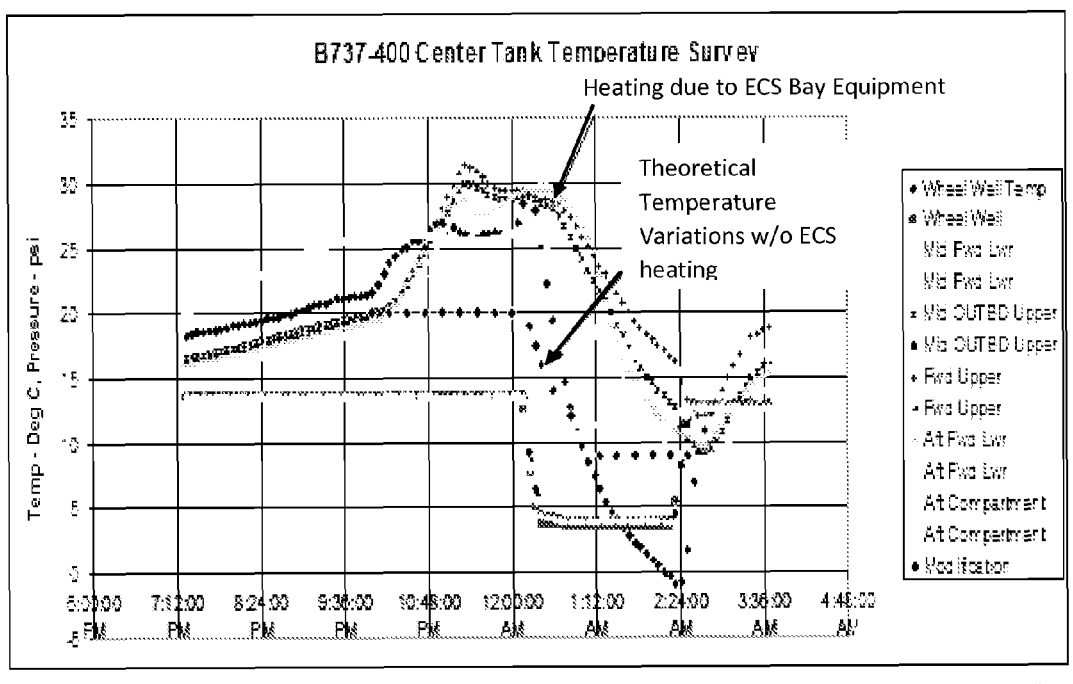

FIG. 8 provides a graph showing measured temperatures over flight time, from various locations about a center tank (fuel tank 4) of an aircraft, at different positions in relation to the center tank. Measured temperatures due to ECS bay heating is marked. In addition, a simulated temperature variation line has been plotted as a theoretical temperature variation without ECS heating of the center tank, due to reduction of the temperature in the ECS bay 10 by implementation of the embodiment described above in relation to FIG. 6, by only cooling the ECS bay 10 using an cold air bleed from the refrigeration/A/C unit when the aircraft is operational on the ground, without discharging air into the center tank, and without routing outside entrained air into the ECS bay during flight. As such, if no ECS bay heating occurs during ground operations, via the embodiments described above in relation to FIG. 6, it is predicted that the center tank will not heat up during flight (theoretical temperature profile in the FIG. 8). When this temperature profile is input to the Monte Carlo analysis program, it calculates a flammability exposure of 0.9%, well below the required limit of 3%.

The proposed methods and systems are less expensive than current nitrogen generation equipment based systems, can employ a standard refrigeration unit, and is capable of bringing the aircraft into compliance with relevant flammability regulations.

Although specific embodiments and examples of the disclosure have been described supra for illustrative purposes, various equivalent modifications can be made without departing from its spirit and scope, as will be recognized by those skilled in the relevant art after reviewing the present disclosure. The various embodiments described can be combined in different manners to provide further embodiments. The described systems, devices and methods can omit some elements or acts, can add other elements or acts, or can combine the elements or execute the acts in a different order than that illustrated, to achieve various advantages. These and other changes can be made in light of the above detailed description. The Summary section of this specification is not intended to identify key features or essential features of the claimed subject matter, nor is it intended to be used as an aid in determining the scope of the claimed subject matter.

In general, in the following claims, the terms used should not be construed to limit the invention to the specific embodiments disclosed in the specification. Accordingly, the invention is not limited by the disclosure, but instead its scope is determined entirely by the following claims.

What is claimed is:

1. A system for reducing flammability exposure in a fuel tank of an aircraft comprising:
    a cold air line configured for providing fluid communication between a cold air unit and a heated space situated proximate the fuel tank;
    an automated shut-off valve disposed to block cold air from being drawn from the cold air unit through the cold air line, when the shut-off valve is shut;
    wherein the fuel tank is a center tank;
    wherein the cold air line is part of an aircraft modification comprising a bleed line tied into a pre-existing cold air outline line of the cold air unit;
    wherein the automated shut-off valve is controlled to be shut during at least a majority of flight time of the aircraft, and to be open during at least a majority of time when the aircraft is operational on the ground; and
    wherein the cold air line comprises at least three spaced-apart discharge locations in the heated space.

2. The system of claim 1 wherein the heated space is an ECS bay.

3. A method for controlling flammability exposure of a fuel tank on an aircraft, the method comprising:
    directing a cold air bleed drawn from an air conditioning unit of the aircraft to a heated space proximate the fuel tank when the aircraft is operational on the ground;
    wherein the fuel tank is a center tank; and
    wherein directing the cold air bleed to the heated space comprises discharging the cold air bleed at spaced apart locations within the heated space.

4. The method of claim 3 further comprising automatically shutting a valve to block the cold air bleed from directly entering the space during at least a majority of flight time of the aircraft.

5. The method of claim 4 wherein the cold air bleed from the air conditioning unit is the only cold air directed by conduit into the heated space.

6. The method of claim 3 wherein no cooling air is directed by conduit into the fuel tank.

7. A method of modifying an aircraft for reducing flammability exposure in a fuel tank of the aircraft comprising:
    connecting a bleed line to a pre-existing cold air outline line of an ECS;
    disposing a discharge opening of the bleed line within a space proximate the fuel tank; and
    providing an automated shut-off valve system operable to block cold air of the outline line from traveling through the bleed line, and configuring the automated shut-off valve system to shut off during at least a majority of time when the aircraft is in flight, but to be open during at least a majority of time when the aircraft is operational on the ground.

8. The method of claim 7 further comprising providing a plurality of spaced apart discharge openings for the bleed line within the space.

* * * * *